July 2, 1935.  W. P. KELLETT  2,006,772
BRAKE MECHANISM FOR SHOCK ABSORBING CARS
Filed March 9, 1934  2 Sheets-Sheet 1

Inventor
William Platts Kellett.

Inventor
William Platts Kellett

Patented July 2, 1935

2,006,772

UNITED STATES PATENT OFFICE 2,006,772

BRAKE MECHANISM FOR SHOCK ABSORBING CARS

William Platts Kellett, New York, N. Y.

Application March 9, 1934, Serial No. 714,771

13 Claims. (Cl. 105—392.5)

In the development of railway transportation equipment it has been proposed to provide a super-structure movable longitudinally in relation to the chassis of the car, such movement being restricted to certain limitations. An example of such equipment may be found in United States Patent 1,940,953 dated December 26, 1933 for Shock absorbing car structures.

It has been found extremely desirable, if not imperative, that the hand control of the brake equipment of such cars should be mounted on the movable platform as the installation of such hand-control on the chassis is extremely dangerous through the movement of the super-structure.

The principal objects of this invention are to provide a car equipment of the shifting platform type with a brake control device mounted on the movable platform and connected with the brake mechanism of the chassis in such a manner as to permit perfect freedom of movement of the platform or super-structure while maintaining a constant condition of operative efficiency between the movable control mechanism and the braking equipment of the car mounted on the chassis.

The principal feature of the invention consists in the novel arrangement of the hand wheel brake shaft and co-operating mechanisms on the shifting platform or super-structure of the car connected through a flexible element vertically disposed with the operating brake lever mounted on the chassis, the flexible vertical element being free to swing to follow the relative longitudinal movement of the super-structure without materially affecting the relation between the hand wheel mechanism and the brake lever, that is to say, the super-structure may oscillate longitudinally upon the chassis without changing the relation between the brake lever and the brake-applying hand wheel, whether the brakes are set or free.

In the accompanying drawings, Figure 1 is a broken plan view of a portion of the deck of a car illustrating the location of the brake cylinder, the hand wheel and the means connecting same.

Figure 1:
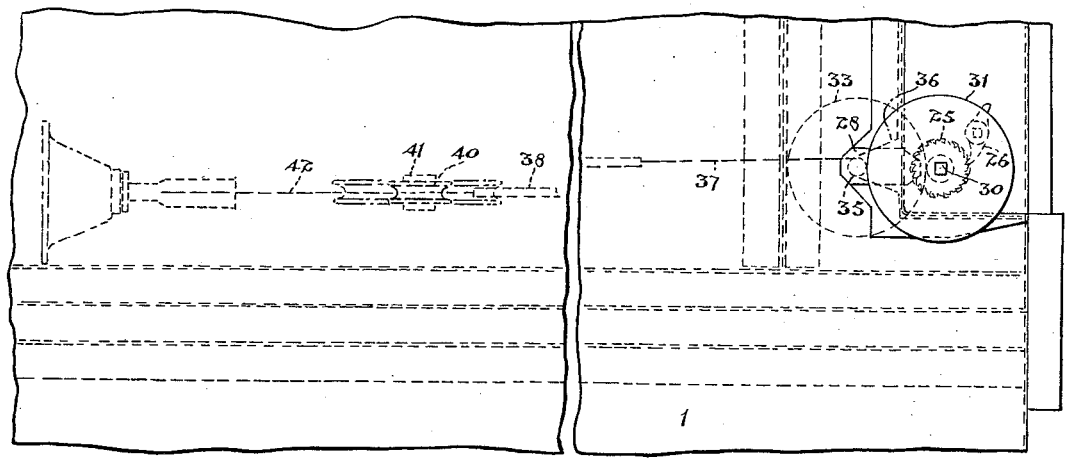
Figure 2:
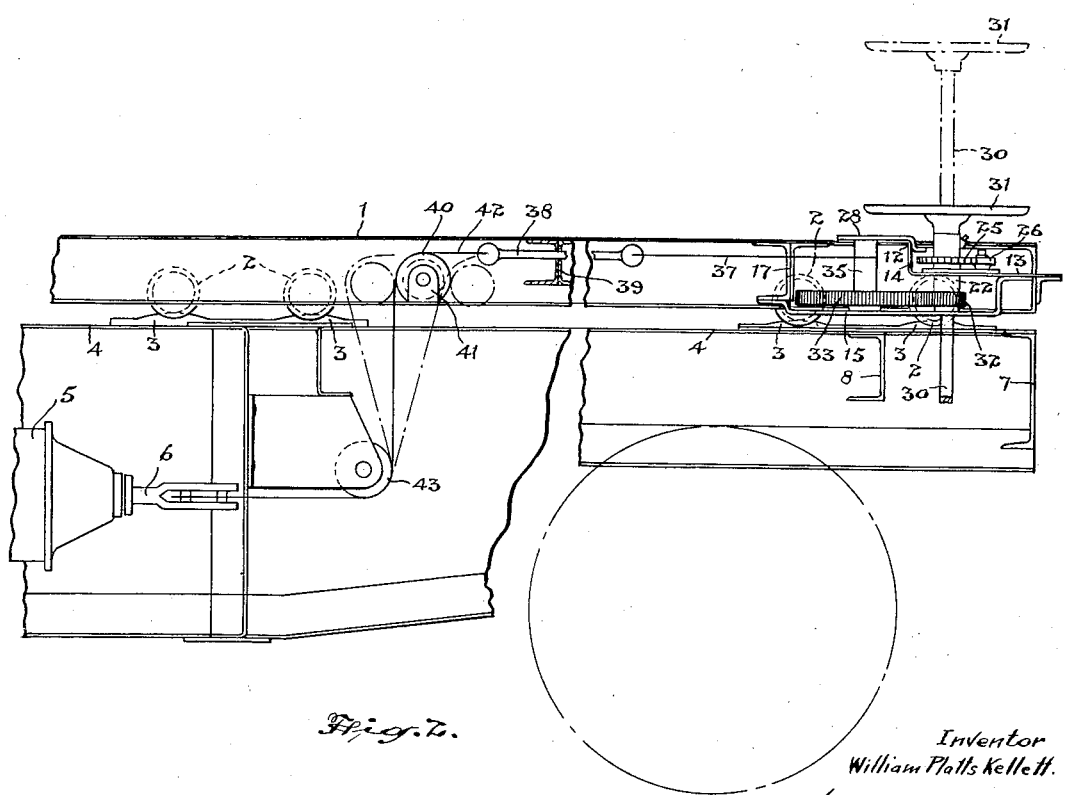
Figure 2 is a broken diagrammatic part sectional elevation of the portion of the car shown in Figure 1 and illustrating the relative arrangement of the hand wheel brake cylinder and interconnecting parts.
Figure 3:
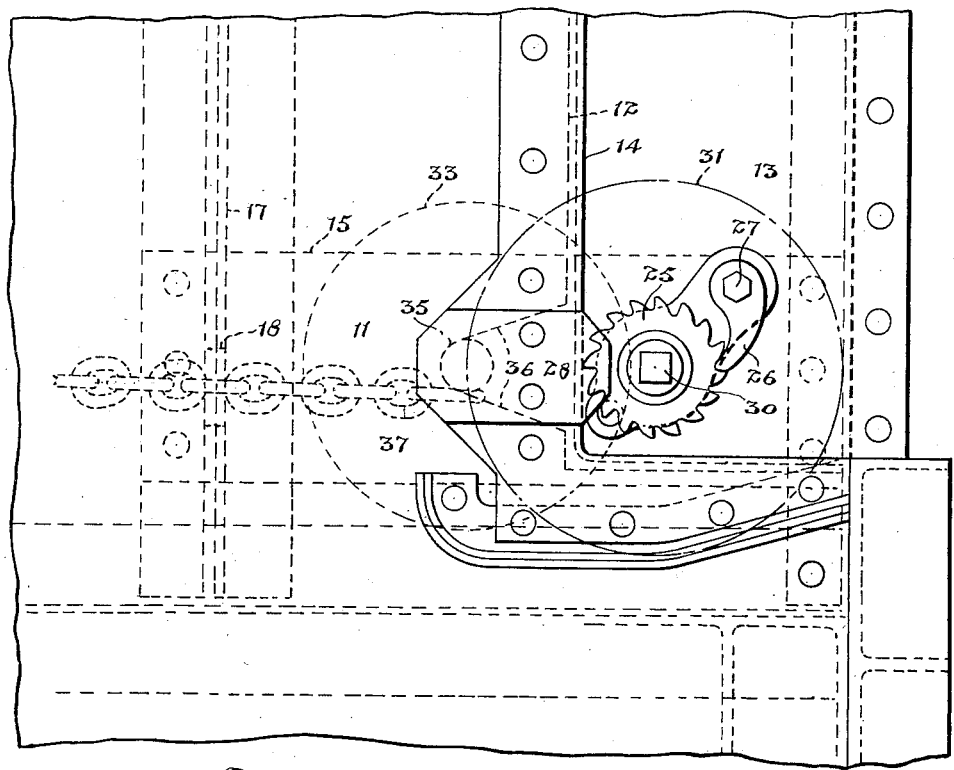
Figure 3 is an enlarged plan view of the portion of the movable super-structure of the car carrying the brake wheel.
Figure 4:
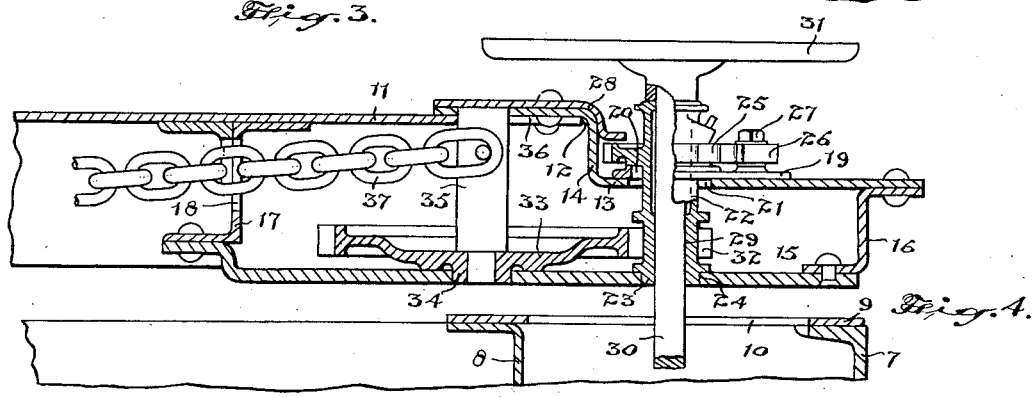
Figure 4 is an enlarged vertical sectional detail of the hand wheel mechanism disclosed in Figure 3.

In the device herein shown the structure illustrated, particularly in Figure 2, shows a longitudinally movable platform or super-structure 1 supported by rollers 2 upon cam blocks 3 mounted on the main frame 4 of the chassis. This main frame or chassis of the car is provided with the usual braking equipment, the only portion of which being herein shown is the brake cylinder 5 with its plunger 6 which connects with and operates the brake lever, which in turn is connected with the brake beam in the manner which is well known and does not require illustration.

The platform 1 is capable of longitudinal movement in either direction supported on the rollers 2, its limit of movement being suitably controlled, the details of such structure being fully illustrated in United States Patent 1,940,953, though it must be understood that the present invention is not limited to being used with this structure only.

The main frame of the car is provided with an end sill 7 and a cross beam 8 is spaced therefrom, said end sill and cross beam being connected by a plate 9 which is provided with a longitudinal slot 10.

At the end of the longitudinally movable platform 1 the top plate 11 is cut away to form a rectangular shaped recess 12, and in this recess is arranged a plate 13 formed with an upwardly offset flange 14 which overlaps the edge of the recess 12.

A bottom plate 15 is spaced below the offset end plate, being rigidly secured thereto by a Z-bar 16 at the front end, and at its inner end it is supported by the cross Z-bar 17, the latter being provided with an opening 18 therethrough.

A plate 19 is secured to the top of the plate 13 and is provided with a journal orifice 20 arranged in alignment with the hole 21 in the plate 13. Journalled in the orifice 20 is a sleeve member 22, the lower end 23 of which is journalled in an orifice 24 in the bottom plate 15.

A ratchet wheel 25 is formed integral with or suitably secured to the upper portion of the sleeve 22 above the plate 19. This ratchet wheel is engaged by a pawl 26 mounted on a bolt 27.

A keeper plate 28 is secured to the top of the offset flange 14 of the plate 13, extends over the ratchet wheel and prevents its displacement.

The sleeve 22 is formed with a rectangular orifice 29 therethrough, in which is slidably mounted the squared brake shaft 30, upon the upper end of which is mounted the hand wheel 31. This shaft is slidable in the sleeve vertically to allow the wheel to be pulled up so that it may be manipulated by the brakeman when standing upon the platform. The shaft extends downwardly from the platform 1 and projects through the longitudinal slot 10 in the top plate of the chassis. The platform may thus oscillate freely without fouling the brake shaft.

The sleeve 22 is provided with a spur pinion 32 which meshes with a spur gear 33, the hub 34 of which is journalled in an orifice in the bottom plate 15. A short shaft 35 is rigidly secured to the gear 33 and extends upwardly therefrom, the upper end thereof having a bearing support in the apex of a V-shaped notch 36 cut in the top plate 11 of the platform 1, and which also extends to a bearing recess in the offset flange 14 of the plate 13 and is secured by the keeper plate 28.

A length of chain 37 is secured to the winding shaft 35 and extends in a horizontal direction through the opening 18 in the cross Z-bar 17.

A horizontal rod 38 slidably arranged in holes in the cross bars 39 of the platform, is connected with the end of the chain 37.

A grooved roller 40 mounted in a bracket 41 on the underside of the platform 1 adjacent to the inner end of the rod 38, supports a length of chain 42 connected to the inner end of the rod 38. This chain extends vertically downward into the car chassis and engages a grooved roller 43 mounted in a suitable bracket support in the chassis in such a position that the chain passing right angularly therearound, extends in a horizontal direction and is connected to the brake lever operating plunger 6.

It will be noted that the platform 1 may oscillate longitudinally on its roller supports as is diagrammatically illustrated in Figure 2 of the drawings without any material difference being made in the length of the chain connection between the brake lever and the brake wheel mechanism, and it will be particularly noted that as the platform oscillates upon the cam block its endwise movement is coincident with a slight downward movement. The co-ordination of these movements and the length of the chain connection maintains a stabilized condition in the length of the connection between the hand wheel brake mechanism and the brake lever.

The operation of the device is extremely simple. The turning of the hand wheel, the shaft of which is square, rotates the sleeve 22, turning the spur pinion 32 and operating the spur gear 33 which meshes therewith. This rotates the chain shaft 35, winding up the chain which pulls on the rod 38 and the chain 42 to operate the brake mechanism, and because of the compensating arrangement of the vertical section of the chain extending between the rollers 40 and 43, the operation of the brakes will be constant, that is to say, unaffected by relative change of position.

It will be understood that changes in the details of construction of the means for operating the chain winding shaft may be made without altering the principal feature of this invention.

Figure 5:
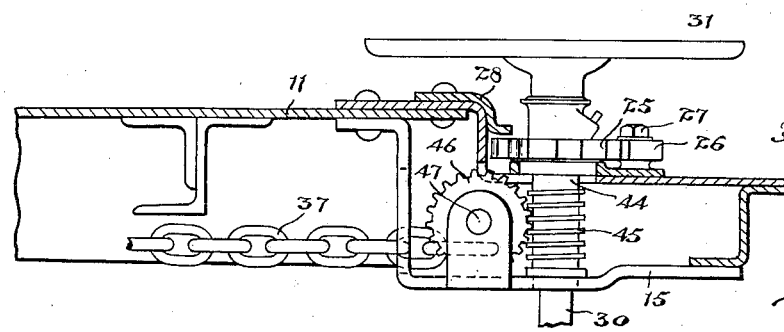
Figure 5 is an enlarged part section and elevational detail showing a slightly modified form of hand wheel mechanism.

Figure 5 illustrates a modification of the invention in which the sleeve member 44 surrounding the brake wheel shaft, instead of carrying a spur pinion, is provided with a thread or worm 45. This engages a worm wheel 46 mounted on a horizontally arranged shaft 47 upon which the chain 37 is wound.

Many of the details of the structures herein outlined may be altered so long as the principal feature is maintained, namely, arranging the hand wheel for operating the brakes of the car upon the movable platform and providing a connection between this mechanism and the brake-applying mechanism on the chassis through a vertical flexible connection which will permit freedom of movement between the chassis and platform.

What I claim as my invention is:—

1. In a car having a brake equipped chassis and a relatively moveable superstructure, auxiliary brake-operating mechanism for applying the brakes on said chassis and mounted solely on said superstructure, and a flexible operating connection connected at one end with the chassis brake mechanism and at the other end with said auxiliary brake-operating mechanism carried by said movable super-structure.

2. Means as claimed in claim 1 in which said flexible operating connection is arranged in part in a normally neutral vertical position between the chassis and movable superstructure for displacement to either side of said normal position on relative longitudinal movement of the car and chassis.

3. In a car having a brake equipped chassis and a relatively moveable superstructure, auxiliary brake-operating mechanism for applying the brakes on said chassis and mounted solely on said superstructure, means connecting the brake mechanism of the chassis with said auxiliary brake operating mechanism of the superstructure including horizontally and vertically arranged portions, the vertical portion forming a positive connection but being capable of oscillation to permit the relative movement between said chassis and said superstructure.

4. In a car having a brake equipped chassis and a relatively moveable superstructure, a hand wheel brake applying mechanism including a gear reduction unit mounted on said superstructure and moving therewith, and means connected with said gear reduction unit provided with a downwardly extending flexible portion operatively connected with the brake mechanism of the chassis, said flexible portion permitting the free movement of the superstructure on the chassis without objectionably affecting the braking relation between the brake mechanism of the chassis and the hand wheel gear reduction unit of the superstructure.

5. In a car having a brake equipped chassis and a relatively moveable superstructure, a hand wheel mechanism mounted on said superstructure and free from contact with said chassis, a horizontal member carried by said superstructure and operatively connected with said hand wheel mechanism, and a downwardly extending member flexibly connected with said horizontal member and operatively connected with the brake operating mechanism of the chassis.

6. A device as claimed in claim 1 in which a hand wheel is journalled in the moveable superstructure, a winding shaft is operatively connected with said hand wheel, a chain is connected with said winding shaft, a horizontal rod connected with said chain is slidably mounted in said superstructure, a chain is connected with the other end of said slidable rod and extends horizontally therefrom and downwardly, a guide is provided on the chassis around which said chain extends and said chain is operatively connected with the brake mechanism of the chassis.

7. In a device as claimed in claim 1, a sleeve rotatably mounted vertically at one end of said superstructure, a hand wheel having its shaft mounted in said sleeve, a winding shaft journalled adjacent to and operatively connected with said sleeve, a brake operating member secured to said winding shaft to be wound therearound, a roller mounted on the superstructure, said brake operating member having a flexible portion extending over and downward from said said roller, and a roller mounted on the chassis around which said flexible portion of the brake operating member extends and which is connected to the braking mechanism of the chassis.

8. In a brake mechanism for shock absorbing cars the combination with a chassis having a brake mechanism thereon, a superstructure mounted for longitudinal movement on said chassis and presenting a platform closely overlying the chassis, means connected with said brake mechanism extending vertically upward from intermediate the depth of the chassis and terminating substantially in the horizontal plane of said closely overlying platform and being free to oscillate with the movement of the superstructure and adapted to be operated from the upper end to effect the application of the brake, and means mounted on said platform and connected with said oscillatable brake applying member and hand-operable from the platform to effect the application of the brakes on the chassis.

9. In a shock absorbing car comprising a chassis and a relatively longitudinally movable superstructure, said superstructure having a recess at one end, a hand wheel brake applying mechanism mounted in said recess independent of any connection with the chassis, and means connected with said hand wheel brake applying mechanism having a portion extending longitudinally of the superstructure and a portion projecting downwardly therefrom, said means being operatively connected with the brake mechanism of the chassis.

10. In a car having a chassis equipped with a braking means and a superstructure mounted on the chassis for shock-reducing movement relative thereto, an auxiliary brake-applying mechanism comprising a hand-operable motion-reduction unit mounted on said superstructure and moving therewith relative to the chassis, and means flexibly connecting the reduction unit on said superstructure with the braking means on said chassis and having portions displaceable respectively with the chassis and with the superstructure on relative movement of the chassis and superstructure to maintain a substantially unaffected braking connection.

11. In a car having a chassis equipped with a braking means and a superstructure mounted on the chassis for shock reducing movement relative thereto, an auxiliary brake-applying mechanism comprising a hand-operable motion-reduction unit mounted on said superstructure and moving therewith relative to the chassis, and means forming a compensating brake connection between the reduction unit on said superstructure and the braking means on said chassis and permitting the said relative movement of the chassis and superstructure.

12. In a car having a chassis equipped with a braking means and a superstructure mounted on the chassis for relative longitudinal shock-relief displacement, brake-applying means hand-operable from said superstructure and having portions relatively displaceable respectively in unison with the chassis and with the superstructure, and means acting to variably space said superstructure and chassis in proportion to the relative longitudinal displacement thereof to compensate for the relative displacement of the said respective portions of said brake-applying means.

13. The combination set forth in claim 12 in which the means for variably spacing the superstructure and chassis comprises cam means interposed therebetween and acting on the relative longitudinal displacement of the superstructure and chassis to effect the desired compensating displacement.

WILLIAM PLATTS KELLETT.